United States Patent [19]

Stahl et al.

[11] Patent Number: 5,219,910
[45] Date of Patent: Jun. 15, 1993

[54] CONCENTRATED AQUEOUS DISPERSIONS OF TETRAFLUOROETHYLENE POLYMERS, AND PROCESS FOR THEIR PREPARATION

[75] Inventors: Karlheinz Stahl, Hofheim am Taunus; Wolfgang Neumann, Kraiburg; Hubert Seitz, Burgkirchen, all of Fed. Rep. of Germany

[73] Assignee: Hoechst Aktiengesellschaft, Frankfurt am Main, Fed. Rep. of Germany

[21] Appl. No.: 916,202

[22] Filed: Jul. 17, 1992

[30] Foreign Application Priority Data

Jul. 20, 1991 [DE] Fed. Rep. of Germany ....... 4124134

[51] Int. Cl.$^5$ ................................................. C08K 5/32
[52] U.S. Cl. ...................................... 524/236; 523/334; 524/544; 524/546; 524/545; 524/714
[58] Field of Search ............... 524/236, 546, 544, 545, 524/714; 523/334

[56] References Cited

U.S. PATENT DOCUMENTS

| | | | |
|---|---|---|---|
| 2,559,752 | 7/1951 | Berry | 524/723 |
| 3,215,741 | 11/1965 | Chadwick | 564/298 |
| 3,283,007 | 11/1966 | Chadwick | 564/298 |
| 3,316,201 | 4/1967 | Hahn et al. | 524/546 |
| 3,468,869 | 9/1969 | Sherburne | 524/236 |
| 3,824,126 | 7/1974 | Katsushima et al. | 524/236 |
| 3,896,071 | 7/1975 | Poirier | 524/546 |
| 3,956,000 | 5/1976 | Kuhls et al. | 524/462 |
| 3,968,069 | 7/1976 | Grimaud et al. | 524/236 |
| 4,369,266 | 1/1983 | Kuhls et al. | 523/332 |
| 4,587,286 | 5/1986 | Wilkinson | 524/546 |
| 4,914,146 | 4/1990 | Honda et al. | 524/546 |

FOREIGN PATENT DOCUMENTS

| | | |
|---|---|---|
| 0193963 | 9/1986 | European Pat. Off. . |
| 0471416 | 2/1992 | European Pat. Off. . |
| 2125752 | 9/1972 | France . |
| 642025 | 8/1950 | United Kingdom . |

OTHER PUBLICATIONS

Derwent Japanese Patents Report 6, No. 34 p. 1:5 (Oct. 2, 1967), p. 1:6 Abstracts Nos. 15761/67 and 15763/67.

Primary Examiner—Veronica P. Hoke
Attorney, Agent, or Firm—Connolly & Hutz

[57] ABSTRACT

Concentrated, aqueous, colloidal dispersions of tetrafluoroethylene polymers having a polymer solids content of 25 to 70% by weight, which comprise, as the dispersion stabilizer, an amine oxide of the formula

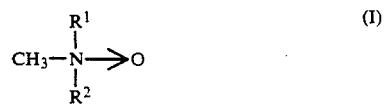

in which $R^1$ is an alkyl radical having 6 to 22 carbon atoms or a mixture of such alkyl radicals and $R^2$ is an alkyl radical having 1 to 22 carbon atoms or a mixture of such alkyl radicals, and in which $R^1$ and $R^2$ are identical or different and 50 to 0% by weight of the alkyl radicals $R^1$ and $R^2$ can be replaced by alkenyl radicals having 6 to 22 carbon atoms and having 1 to 3 C=C double bonds, are obtained by concentration with addition of these dispersion stabilizers. The dispersions are used for impregnating yarns and textile sheet-like structures.

10 Claims, No Drawings

CONCENTRATED AQUEOUS DISPERSIONS OF TETRAFLUOROETHYLENE POLYMERS, AND PROCESS FOR THEIR PREPARATION

DESCRIPTION

The invention relates to concentrated, aqueous, colloidal dispersions of tetrafluoroethylene polymers having a polymer solids content of 25 to 70% by weight and containing an amine oxide as a dispersion stabilizer, and to a process for their preparation and to their use.

Aqueous, colloidal dispersions of fluorine polymers are widely used for coating and impregnating the most diverse types of substrates. However, aqueous, colloidal dispersions obtained directly from the polymerization process are not very suitable for this purpose, since the homoor copolymerization processes for fluorine-containing monomers can usually be carried out without excessive coagulate formation only up to a solids content of the polymer in the range of not more than 30% by weight. However, coatings using such dispersions are uneconomical and not very satisfactory, since not only must an excessive amount of water be evaporated off after the coating operation, but also the film thickness and the filmforming properties do not meet the requirements imposed. It is therefore customary and well-known to the expert to subject such dispersions to a concentration process, which increases the solids content to values of up to 70% by weight. Such known concentration processes are, in particular, gentle evaporation in vacuo (U.S. Pat. No. 3,316,201) and concentration by electrodecantation (GB-A 642 025) or by ultrafiltration (U.S. Pat. No. 4,369,266). In these processes, it is customary to add an anionic, nonionic or also cationic dispersion stabilizer, the purpose of which is to prevent coagulation of the colloidally dispersed fluorine polymers. Alkoxylated alkylphenols, and also alkali metal lauryl-sulfate, are used particularly frequently for such purposes in commercial products. Such dispersion stabilizers, which are added before or during the concentration process, remain in the dispersion and are also intended, in particular, to ensure stability during storage and transportation to the point of use of the dispersion. However, the presence of such dispersion stabilizers presents disadvantages in coating processes such as are carried out with concentrated, aqueous fluorine polymer dispersions. Above all, in the case of those tetrafluoroethylene polymers which require relatively low baking temperatures and are therefore particularly suitable for coating fabric, it is found that the resulting coatings are considerably discolored after baking and the contents of dispersion stabilizers which remain therein tend to form an exudate, a tacky surface on the coating which very adversely influences its non-stick properties and soiling behavior. This particularly applies also in the case of impregnation of yarns with polytetrafluoroethylene or with copolymers of tetrafluoroethylene, since in this process usually only drying at temperatures of up to 150° C. (or at higher temperatures but with very short residence times) takes place. The dispersion stabilizers customary to date remain to their full or virtually full extent in the impregnation in this procedure, which is exceptionally undesirable because of the disadvantages mentioned. If, for example, stuffing boxes, packings or other seals which come into contact with liquids are produced from such impregnated yarns, these liquids may become contaminated by the dispersion stabilizers mentioned.

Even in the case of tetrafluoroethylene polymers with high baking temperatures, however, it must be expected that the known dispersion stabilizers are not completely removed and that discolorations remain after the baking operation.

These disadvantages are avoided according to the invention by a concentrated, aqueous, colloidal dispersion of a tetrafluoroethylene polymer having a polymer solids content of 25 to 70% by weight, based on the total weight of the aqueous dispersion, and having a content of dispersion stabilizer, which dispersion comprises 0.5 to 15% by weight, based on the polymer solid, of an amine oxide of the formula

(I)

in which $R^1$ is an alkyl radical having 6 to 22 carbon atoms or a mixture of such alkyl radicals and $R^2$ is an alkyl radical having 1 to 22 carbon atoms or a mixture of such alkyl radicals, and in which $R^1$ and $R^2$ can be identical or different and 50 to 0% by weight of the alkyl radicals $R^1$ and $R^2$ can be replaced by alkenyl radicals having 6 to 22 carbon atoms and 1 to 3 C=C double bonds.

The amine oxides of the formula

(I)

contained in the concentrated, aqueous, colloidal tetrafluoroethylene polymer dispersions according to the invention are preferably mixtures containing alkyl radicals $R^1$ in the range from 6 to 22 carbon atoms. Such mixtures particularly preferably contain alkyl radicals having 6 to 14 carbon atoms in an amount of 65 to 100% by weight and alkyl radicals having 5 to 22 carbon atoms in an amount of 0 to 35% by weight, in each case based on the total amount by weight of amine oxide. The amine oxides preferably contain a mixture of alkyl radicals in the range from 1 to 22 carbon atoms as radicals $R^2$ here.

In another particularly preferred variant of the invention, $R^2$ is a $CH_3$ radical. It is also possible for 50 to 0% by weight, preferably 30 to 0% by weight, of the alkyl radicals $R^1$ and $R^2$ to be replaced by alkenyl radicals having 6 to 22 carbon atoms, preferably 10 to 22 carbon atoms, and having 1 to 3 C=C double bonds.

The concentrated, aqueous, colloidal dispersions according to the invention comprise the amine oxides of the formula I, as dispersion stabilizers, in a concentration of preferably 1 to 10% by weight, in particular 1 to 7% by weight, based on the polymer solid.

The amine oxides of the formula I contained in the dispersions according to the invention are surface-active substances which are known per se. They are usually prepared by oxidation of the corresponding tertiary amines with aqueous hydrogen peroxide solutions, as described in U.S. Pat. Nos. 3,215,741 or 3,283,007 or EP-A-229 340.

The tetrafluoroethylene (TFE) polymers contained in the dispersions according to the invention can be either those which cannot be processed from the melt or those which can be shaped from the melt by customary shaping processes for thermoplastics. The group of TFE polymers mentioned first—summarized by the expression "cannot be processed from the melt"—includes, primarily, the homopolymer, i.e. polytetrafluoroethylene itself, and in addition also the so-called "modified" tetrafluoroethylene polymers, i.e. those polymers of tetrafluoroethylene which comprise a fluorinated or preferably perfluorinated comonomer in an amount which is so small—usually <1% by weight according to ASTM D 1457 or D 4895—that the character of the polymer as "cannot be processed from the melt" is retained. Such modifying comonomers are, for example, chlorotrifluoroethylene, hexafluoroisobutylene, 1-perfluorobutene, perfluoro(alkylvinyl) ethers having a perfluoroalkyl radical containing 1 to 5 carbon atoms, preferably perfluoro(propylvinyl) ether, and hexafluoropropylene. Such tetrafluoroethylene polymers have an apparent melt viscosity of at least $1 \times 10^8$ s Pa.s at 380° C., measured by the creep test [Ajroldi et al., J. Appl. Polym. Sci., 14 (1970), page 79 et seq.].

However, the TFE polymers contained in the dispersions according to the invention can also be those copolymers of TFE which, because of their higher content of comonomers, have a lower melt viscosity—usually less than $1 \times 10^6$ s Pa.s—and can be shaped from the melt. Such copolymers are, in particular, those of TFE with [the following are used as abbreviations below: CTFE=chlorotrifluoroethylene, HFP=hexafluoropropylene, PAVE=perfluoro(alkylvinyl) ether, E=ethylene, VDF=vinylidene fluoride, PPVE=perfluoro(propylvinyl) ether]:

a) HFP or higher perfluoroolefins of the formula $CF_2=CF-Rf1$, in which Rf1 is a perfluorinated alkyl radical having 1 to 10 carbon atoms in a straight or branched chain;

b) PAVE or perfluoro(alkylvinyl) polyethers of the formulae $CF_2=CF-O-Rf2$ and $CF_2=CF-O[CF_2CF(CF_3)O]_n-Rf2$, in which Rf2 is a perfluorinated alkyl radical having 1 to 5 carbon atoms in a straight or branched chain and n is 1 to 5, preferably PPVE;

c) HFP and PAVE, in particular HFP and PPVE;

d) E, such copolymers preferably comprising at least one other copolymerizable monomer, and often also two or more thereof. Such comonomers are preferably chosen from the group comprising perfluorinated olefins, HFP being preferred; from the group comprising PAVE or polyethers of the abovementioned formulae, PPVE being preferred; from the group comprising fluorine-containing olefins, preferably 3,3,3-trifluoro-2-trifluoromethylpropylene; from the group comprising vinyl esters, such as, for example, vinyl butyrate, and from the group comprising VDF and CTFE; such copolymers of the type TFE/E, optionally with other monomers, consist of not more than 60 mol % of TFE, 60 to 40 mol % of ethylene and 0 to 10 mol % of the content of third and if appropriate fourth monomers mentioned;

e) VDF, such copolymers preferably also containing—in addition to TFE and VDF—at least one other ethylenically unsaturated, preferably fluorine—containing comonomer; HFP or PAVE, and optionally also combinations of the two, are particularly suitable here; these thermoplastic copolymers comprise the TFE in amounts of 40 to 80 mol %, in the case of the terpolymers and quaternary polymers 40 to 65 mol %, and the VDF in amounts of more than 20 mol %; a preferred combination is TFE/VDF/HFP;

f) CTFE, in which case either TFE or CTFE can be the predominant constituent.

Finally, low molecular weight PTFEs, such as are obtainable as colloidal aqueous dispersions by telomerization of TFE in the presence of, for example, methylene chloride or other telogens and of a surface-active agent in the aqueous phase, as described in U.S. Pat. No. 3,956,000, are also possible TFE polymers for the dispersions according to the invention.

All of these tetrafluoroethylene polymers—PTFE, modified PTFE and TFE copolymers—can be obtained as aqueous, colloidal dispersions in a well-known manner by a process, the principles of which are already known from U.S. Pat. No. 2,559,752. In this case, the aqueous polymerization medium comprises surface-active agents, in particular perfluorocarboxylic acids, in an amount which is sufficient to keep the polymer formed in colloidal dispersion and to prevent premature coagulation. However, stable colloidal dispersions having a particle size of 0.01 to 0.5 μm are obtainable directly from the polymerization or copolymerization to give TFE polymers without excessive coagulate formation with a polymer solids content of only not more than 30% by weight, and usually even only up to 25% by weight or less. Such dispersions, if they are to be used for coating or impregnating purposes, must therefore be subjected to a concentration process to a polymer solids content of 25 to 70% by weight, the addition of a dispersion stabilizer being absolutely necessary in order to avoid coagulation during the concentration operation. These dispersion stabilizers remain in the dispersion here to guarantee stability during transportation and storage.

To avoid the disadvantages of the known dispersion stabilizers, an amine oxide of the abovementioned formula I or mixtures of such amine oxides with the abovementioned definitions of the radicals $R^1$ and $R^2$ are employed according to the invention. The concentration process can be carried out by one of the processes described above. For this, the amine oxide is added before or at the start of the concentration operation, and in particular preferably the entire amount needed for stabilization during concentration of the polymer dispersion and during transportation, storage and later use. However, it is also possible first to add only some of the required amount and to top up the dispersion with the remainder in portions or in one batch during the concentration process, preferably towards the end of the process. The amount to be added depends on the required—lower—final content in the dispersion and on the concentration process used. The reduction in the concentration of dispersion stabilizer is, for example, very low during concentration by evaporation and somewhat higher during the preferred ultrafiltration, wherein the particular portion separated off can be recovered.

The total amount of dispersion stabilizer to be employed can easily be determined by a preliminary experiment. The amount still present toward the end or also after the end of the concentration process can also be determined in relation to the polymer solid present, and any deficit can be compensated by addition of a corresponding amount.

Other additives can be added to the concentrated, aqueous, colloidal dispersions according to the invention The dispersions can thus be brought to an alkaline or acid pH by addition of ammonia or of other basic or acid agents. For certain intended uses, customary fillers and pigments can be added, such as, for example, carbon black, graphite, charcoal powder, mica, talc, glass in the form of powder, fibers, beads or hollow beads, silicon dioxide, for example in the form of quartz, silicates, metal oxides and double oxides, such as iron oxide, cobalt oxide, chromium oxide, aluminum oxide, titanium oxide, antimony trioxide and lead oxide, cobalt blue, ultramarine, organic pigments, such as benzidine coloring agents or phthalocyanine coloring agents, salt-like substances, such as potassium titanate or barium titanate, and furthermore also metals in the form of flakes, scales or powders, such as bronze, copper, aluminum or brass, as well as synthetic fibers of plastics of high temperature resistance, such as, for example, polyimide fibers or aramid fibers.

The dispersions according to the invention can also comprise lubricants, such as graphite, molybdenum sulfide, fluorocarbon oils, silicone oils, paraffin oils, calcium stearate or lead stearate, and furthermore customary thickening agents or viscosity regulators, such as homo- and copolymers of acrylates or methacrylates, or methylcellulose.

If the dispersions according to the invention are to be put to uses which require baking or sintering of the TFE polymers, other film-forming and high-temperature resistant resins can also be admixed, such as polyimides, polyamide-imides, polyether-sulfones, polyarylene sulfides, polyether-ketones, polyether-imides, polysiloxanes or triketoimidazolidine polymers or mixtures thereof.

The dispersions stabilized according to the invention with the amine oxide of the formula I are used for impregnating and soaking fibers as well as yarns and blended yarns, in particular yarns, which are employed as packings for sealing purposes, of naturally occurring fibers, such as cotton, of synthetic fibers, such as viscose staple or polyester, polypropylene, polyamide, aramid or polyacrylic fibers, and of fibers of graphite, carbon, glass and other naturally occurring and synthetic substances.

Such impregnations are usually not baked or sintered above the melting point of the substrate, but only dried at elevated temperatures. This restriction is absolutely necessary if the impregnated substrate does not tolerate very high temperatures. Drying temperatures of up to 150° C. are in general necessary and possible for this purpose. During this drying operation, the dispersion stabilizers employed according to the invention are removed completely or almost completely from the coating. This is a surprising advantage, since the dispersion stabilizers customary to date such as oxyalkylated alkylphenols or alkali metal lauryl-sulfates, remain in the TFE polymer coating during such drying operations.

Disadvantages such as transfer of the dispersion stabilizer into liquid media, if seal packings are in contact with such liquids, or else such as physiological risks which arise on contact with foodstuffs, and also such as exudates and build up of dispersion stabilizer on the surface, which unavoidably causes soiling, are thus avoided.

The dispersions according to the invention are also used for impregnation or coating of sheet-like structures, i.e. textile sheet-like structures, such as non-wovens, needlefelts or woven fabrics of the abovementioned textile materials, and also of hard surfaces, such as, for example, metals, porous and smooth ceramic surfaces or glass. If such substrates are resistant to relatively high temperatures, the coatings can also be baked or sintered at such higher temperatures. The disadvantages which occur with dispersions comprising the dispersion stabilizers customary to date are likewise avoided here. No discolorations are found in the sintered coatings, and the dispersion stabilizers are removed completely even after short sintering times.

The dispersion stabilizers according to the invention can of course also be employed for stabilizing fluoropolymer dispersions having a polymer solids content of less than 25% by weight if this is necessary for specific reasons, for example in cases of increased shear stress.

The invention is illustrated in still more detail by the following examples.

EXAMPLE 1

2.4 kg of a 30% strength by weight solution of an amine oxide of the formula I [$R^1$=2% $C_{10}H_{21}$, 55% $C_{12}H_{25}$, 22% $C_{14}H_{29}$, 10% $C_{16}H_{33}$, 2% $C_{18}H_{37}$, 7% $C_{18}H_{35}$ (monounsaturated) and 2% $C_{18}H_{33}$ (diunsaturated); $R^2$=$CH_3$] are added to 60 kg of a 20% strength by weight colloidal, aqueous dispersion of a modified tetrafluoroethylene polymer comprising 0.03 mol % of HFP. The dispersion is concentrated to a polymer content of 60% by weight in an ultrafiltration unit by means of tubular membranes of the ®Nadir type. When a polymer solids content of 58% by weight is reached, a further 0.8 kg of the abovementioned amine oxide solution is added. The concentrated, colloidal, aqueous dispersion contains no coagulate at all and has a content of 60% by weight of modified PTFE and a content of 3.3% by weight of the amine oxide mentioned, based on the polymer solid. This dispersion is used to impregnate aramid yarn (®Kevlar regenerated fiber). Linear density of braiding yarn: 1000 tex × 1.

A two-diagonal packing was braided on a braiding machine from Herzog Maschinenfabrik, Oldenburg. The braided packing consists of a total of 30 threads, which form a square packing having an edge length of 8 mm (8×2 braiding threads, 4×2 corner threads, 6×1 middle threads). Take-off speed of the packing: 1.8 m/minute.

In the braiding operation, each thread is first impregnated in the dispersion and then braided to form the packing. After braiding, the packing is dried at 150° C. for 2 hours. The empty packing (dummy) weighs 33 g/m, and the aramid packing impregnated with the polymer dispersion weighs 73 g/m (amount applied 40 g/m, in each case based on a cross-section of 8×8 mm). At the drying temperature mentioned, the dispersion stabilizer has escaped practically completely from the impregnation. This can be seen by the fact that on heating (briefly to 350° C.) no further weight loss occurs. The impregnated packing has a smooth surface which does not differ noticeably from that of a conventional PTFE/aramid fiber packing. The color of the impregnation is pure white.

EXAMPLE 2

The same amounts of the same dispersion as in Example 1 are employed and are subjected to concentration by ultrafiltration in the same manner as in Example 1, but with the deviation that 2.4 kg of a 30% strength by weight solution of an amine oxide of the formula I ($R^1$=2% $C_{10}H_{21}$, 51% $C_{12}H_{25}$, 21% $C_{14}H_{29}$, 13% $C_{16}H_{33}$, 13% $C_{18}H_{37}$; $R^2$=$CH_3$) are added. When a polymer solids content of 56% by weight is reached, 0.8 kg of the abovementioned amine oxide solution is added. This gives a 58% strength by weight polymer dispersion having an amine oxide content of 4.3% by weight, based on the polymer solid.

An aramid packing is impregnated with this dispersion as described in Example 1. The total weight of the impregnated packing is 67 g/m, i.e. the amount of polymer applied is 34 g/m. The color of the impregnation is pure white and the surface of the finished packing is smooth and non-stick. It contains virtually no more dispersion stabilizer. On heating (briefly to 350° C), no weight loss occurs.

EXAMPLE 3

2.4 kg of a 30% strength by weight solution of an amine oxide of the formula I ($R^1$=2% $C_{10}H_{21}$, 51% $C_{12}H_{25}$, 21% $C_{14}H_{29}$, 13% $C_{16}H_{33}$, 13% $C_{18}H_{37}$; $R^2$=$CH_3$) are added to 60 kg of a 20% strength by weight colloidal, aqueous dispersion of a copolymer consisting of 50 mol % of TFE, 48 mol % of E and 2 mol % of HFP. The dispersion is concentrated on an ultrafiltration unit, as described in Example 1. 0.8 kg of the amine oxide mentioned are subsequently added when a polymer solids content of 46% by weight is reached. A dispersion having an amine oxide content of 5.9% by weight, based on the polymer solid, and a polymer solids content of 47% by weight results. This dispersion is distinguished by good settling properties and an outstanding shear stability. The pH is 6.2.

An aramid needlefelt (®Nomex) having a dead weight of about 400 g/m² was used as the substrate for the impregnation. The needlefelt is sprayed on one side, on the smooth needlefelt side, with the dispersion mentioned with the aid of an air spray gun (1 mm nozzle) and is then dried at 280° C. for 15 minutes. In a subsequent working step, the finished side of the needlefelt is smoothed briefly with twin rollers at 280° C. The amount of TFE/E/HFP copolymer applied being 6, 18 or 86 g/m².

When an amount of ≧18 g/m² is applied, the textile handle is lost. As the amount applied increases, the needlefelt becomes smoother and glossier. The coating produced has fused well. This finish contains virtually no more dispersion stabilizer, as further heating up to 350° C. without weight loss shows.

EXAMPLE 4

2.4 kg of a 30% strength by weight solution of an amine oxide of the formula I ($R^1$=2% $C_{10}H_{21}$, 51% $C_{12}H_{25}$, 21% $C_{14}H_{29}$, 13% $C_{16}H_{33}$ and 13% $C_{18}H_{37}$; $R^2$=$CH_3$) are added to 50 kg of a 24% strength by weight dispersion of a PTFE micropowder, prepared by the process according to U.S. Pat. No. 3,956,000, and the mixture is concentrated by ultra-filtration as described in Example 1. 1.2 kg of the same amine oxide solution are subsequently added at a PTFE content of 55% by weight. A concentrated dispersion having an amine oxide content of 4.9% by weight, based on the polymer solid, and a PTFE content of 57% by weight is obtained. The dispersion has a pH of 7.8 and good settling properties, and an improved shear stability in comparison with conventionally stabilized PTFE dispersions. The ®Nomex needlefelt from Example 3 and a polyester needlefelt having an empty weight of 470 g/m² are used as the substrate for impregnation with this dispersion.

The two felt samples are sprayed on one side, using the spray gun, and then dried at 200° C. for 15 minutes. Smoothing of the surface is again subsequently carried out on twin rollers heated at 200° C. The amount of PTFE applied to the polyester is 68 g/m². The surface is exceptionally smooth and non-stick. No discolorations occur; the impregnated needlefelt is pure white. The amount applied to the ®Nomex needlefelt is 13 and 36 g/m² respectively. As the amount applied increases, the surface smoothness and non-stick properties increase. The material applied no longer contains dispersion stabilizer, which can be seen in the case of the ®Nomex needlefelt by brief heating at 350° C. without weight loss (this test cannot be carried out on the polyester).

EXAMPLE 5

90 g of a 60% strength by weight amine oxide solution consisting of a mixture of two amine oxides of the formula I:

A) $R^1$ = 1% $C_6H_{13}$, 35% $C_8H_{17}$, 54% $C_{10}H_{21}$ and 10% $C_{12}H_{25}$; $R^2$ = $CH_3$ and B) $R^1$ = $R^2$ = 2% $C_8H_{17}$, 95% $C_{10}H_{21}$ and 3% $C_{12}H_{25}$ in a molar ratio of A:B=3:1, are added to 4.2 kg of a 20% strength by weight dispersion of a modified tetrafluoroethylene polymer comprising 0.03 mol % of HFP.

The dispersion is evaporated gently in vacuo in a rotatory evaporator and concentrated to a polymer solids content of 55% by weight. It then contains 3.7% by weight of the amine oxide mixture, based on the polymer solid.

EXAMPLE 6

2.4 kg of a 30% strength by weight solution of an amine oxide of the formula I ($R^1$=2% $C_{10}H_{21}$, 51% $C_{12}H_{25}$, 21% $C_{14}H_{29}$, 13% $C_{16}H_{33}$ and 13% $C_{18}H_{37}$; $R^2$=$CH_3$) are added to 55 kg of a 22% strength by weight colloidal, aqueous PTFE dispersion, and the mixture is concentrated by ultra-filtration as described in Example 1. When a PTFE content of 52% by weight is reached, 1.2 kg of the amine oxide solution mentioned are subsequently added. A concentrated, aqueous colloidal dispersion having a PTFE content of 57% by weight and a amine oxide content of 3.4% by weight, based on the polymer solid, is obtained.

EXAMPLE 7

2.4 kg of a 30% strength by weight solution of an amine oxide of the formula I ($R^1$=2% $C_{10}H_{21}$, 51% $C_{12}H_{25}$, 21% $C_{14}H_{29}$, 13% $C_{16}H_{33}$ and 13% $C_{18}H_{37}$; $R^2$=$CH_3$) are added to 50 kg of a 24% strength by weight colloidal, aqueous dispersion of a terpolymer comprising 97.7 mol % of TFE, 1.3 mol % of PPVE and 1.0 mol % of HFP, and the mixture is concentrated by ultrafiltration as described in Example 1. At a polymer solids content of 53% by weight, 1.2 kg of the amine oxide solution are subsequently added. A concentrated, aqueous, colloidal dispersion having a polymer solids content of 56% by weight and an amine oxide content of 5.8% by weight, based on the polymer solid, is obtained.

EXAMPLE 8

2.3 kg of a 30% strength by weight solution of an amine oxide of the formula I ($R^1$=70% $C_{12}H_{25}$, 25% $C_{14}H_{29}$ and 5% $C_{16}H_{33}$; $R^2$=$CH_3$) are added to 60 kg of the colloidal aqueous dispersion of a TFE polymer modified with HFP as employed in Example 1 and the mixture is concentrated by ultrafiltration as described in Example 1. When a polymer solids content of 43% by weight is reached, 1.0 kg of the amine oxide solution is subsequently added. A concentrated, aqueous, colloidal dispersion having a polymer solids content of 59% by weight and an amine oxide content of 1.9 by weight, based on the polymer solid, is obtained.

An impregnated aramid yarn packing is prepared and dried in accordance with Example 1 using this dispersion. The amount of PTFE applied is 35 g/m of packing. The color of the impregnation is white and the surface of the impregnated packing is smooth and nonstick. It contains virtually no more dispersion stabilizer, which manifests itself in the fact that no further weight loss is observed on heating (briefly to 350° C.).

We claim:

1. A concentrated aqueous, colloidal dispersion, comprising 25 to 70% by weight, based on the total weight of the aqueous dispersion, of a tetrafluoroethylene polymer and 0.5 to 15% by weight, based on the polymer solid, of an amine oxide of the formula

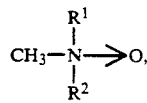

in which $R^1$ is alkyl having 6 to 22 carbon atoms or a mixture of such alkyls and $R^2$ is alkyl having 1 to 22 carbon atoms or a mixture of such alkyls, and in which 50 to 0% by weight of the alkyls $R^1$ and $R^2$ are optionally replaced by alkenyl having 6 to 20 carbon atoms and having 1 to 3 C=C double bonds.

2. A dispersion as claimed in claim 1, wherein, in the amine oxide of the formula I, $R^1$ is a mixture of 65 to 100% by weight of alkyls having 6 to 14 carbon atoms and of 35 to 0% by weight of alkyls having 15 to 20 carbon atoms.

3. A dispersion as claimed in claim 1, wherein $R^2$ is $CH_3$.

4. A dispersion as claimed in claim 1, wherein the content of amine oxide is 1 to 10%.

5. A dispersion as claimed in claim 1, wherein the tetrafluoroethylene polymer is the homopolymer polytetrafluoroethylene.

6. A dispersion as claimed in claim 1, wherein the tetrafluoroethylene polymer is a polytetrafluoroethylene which cannot be processed in the melt and comprises up to 0.5 mol % of a modifying monomer.

7. A dispersion as claimed in claim 1, wherein the tetrafluoroethylene polymer is a tetrafluoroethylene copolymer which can be processed from the melt.

8. A dispersion as claimed in claim 7, wherein the tetrafluoroethylene copolymer which can be processed from the melt also comprises at least one copolymer from the group comprising hexafluoropropylene, chlorotrifluoroethylene, vinylidene fluoride, perfluoro(propylvinyl) ether and ethylene.

9. A dispersion as claimed in claim 1, wherein the tetrafluoroethylene polymer is a low molecular weight polytetrafluoroethylene which has been obtained as an aqueous, colloidal dispersion by reaction of tetrafluoroethylene with a compound having a telogenic action by the process of dispersion polymerization.

10. A process for the preparation of a concentrated, colloidal, aqueous dispersion of a tetrafluoroethylene polymer, which comprises adding an amine oxide of the formula

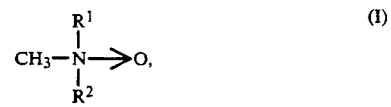

in which $R^1$ is alkyl having 6 to 22 carbon atoms or a mixture of such alkyls and $R^2$ is alkyl having to 22 carbon atoms or a mixture of such alkyls, and 50 to 0% by weight of the alkyls $R^1$ and $R^2$ are optionally replaced by alkenyl having 6 to 22 carbon atoms and having 1 to 3 C=C double bonds, as the dispersion stabilizer to an aqueous, colloidal dispersion of the same polymer having a lower polymer solids content and concentrating the dispersion to a polymer solids content of 25 to 70% by weight.

* * * * *